US012542831B2

(12) United States Patent
Giorgio et al.

(10) Patent No.: US 12,542,831 B2
(45) Date of Patent: Feb. 3, 2026

(54) COMMUNICATION SYSTEM FOR AIRCRAFT

(71) Applicants: SAFRAN SEATS, Plaisir (FR); SAFRAN ELECTRONICS & DEFENSE, Paris (FR)

(72) Inventors: Roméo Giorgio, Moissy-Cramayel (FR); Nicolas Fanton, Moissy-Cramayel (FR); Nicolas Lipari, Moissy-Cramayel (FR); Jean-Marc Obadia, Moissy-Cramayel (FR)

(73) Assignees: SAFRAN SEATS, Plaisir (FR); SAFRAN ELECTRONICS & DEFENSE, Paris (FR)

( * ) Notice: Subject to any disclaimer, the term of this patent is extended or adjusted under 35 U.S.C. 154(b) by 611 days.

(21) Appl. No.: 18/014,925

(22) PCT Filed: Jul. 1, 2021

(86) PCT No.: PCT/EP2021/068264
§ 371 (c)(1),
(2) Date: Jan. 6, 2023

(87) PCT Pub. No.: WO2022/008354
PCT Pub. Date: Jan. 13, 2022

(65) Prior Publication Data
US 2023/0336626 A1    Oct. 19, 2023

(30) Foreign Application Priority Data
Jul. 9, 2020    (FR) ....................................... 2007288

(51) Int. Cl.
*H04L 67/12*    (2022.01)
*H04W 74/0808*    (2024.01)

(52) U.S. Cl.
CPC ......... *H04L 67/12* (2013.01); *H04W 74/0808* (2013.01)

(58) Field of Classification Search
CPC .......................... H04W 74/0808; H04L 67/12
See application file for complete search history.

(56) References Cited

U.S. PATENT DOCUMENTS

2006/0072491 A1*    4/2006    Simons ................... H04L 67/61
370/328
2011/0087396 A1    4/2011    Eregen et al.

OTHER PUBLICATIONS

IEEE 802.15.4-2011 "Part 15.4: Low-Rate Wireless Personal Area Networks (LR-WPANs)" (Year: 2011).*

* cited by examiner

*Primary Examiner* — James P Duffy
(74) *Attorney, Agent, or Firm* — MUNCY, GEISSLER, OLDS & LOWE, P.C.

(57) ABSTRACT

A communication system for an aircraft includes a first data concentrator, a first plurality of communicating devices for sending data to the first concentrator by wireless transmission. The first concentrator broadcasts at least one parameterisation signal for parameterising an operating cycle of the system and each communicating device sends a unique identification signal to the first concentrator, in response to this parameterisation signal, the first concentrator assigning a plurality of separate time windows valid for the cycle and each given communicating device transmitting data intended for the first concentrator via the channel associated with the time window assigned to this given device and only during this window.

14 Claims, 4 Drawing Sheets

Fig.2

|  | F1 | F2 | F3 | F4 | F5 | F6 | F7 | F8 |
|---|---|---|---|---|---|---|---|---|
| C1 | Di1 | Di5 | Di9 | Di13 | Ø | Ø | Ø | Ø |
| C2 | Di2 | Di6 | Di10 | Di14 | Ø | Ø | Ø | Ø |
| C3 | Di3 | Di7 | Di11 | Di15 | Ø | Ø | Ø | Ø |
| C4 | Di4 | Di8 | Di12 | Ø | Ø | Ø | Ø | Ø |

Fig.3

| | F1 | | | | | | | | | F2 | | | | | | | | | F3 | | | | | | | | | F4 | | | | | | | | |
|---|---|---|---|---|---|---|---|---|---|---|---|---|---|---|---|---|---|---|---|---|---|---|---|---|---|---|---|---|---|---|---|---|---|---|---|
| C1 | D1 | | | | | | | | | D4 | | | | | | | | | D7 | | | | | | | | | D10 | | | | | | | | |
| C2 | D2 | | | | | | | | | D5 | | | | | | | | | D8 | | | | | | | | | ∅ | | | | | | | | |
| C3 | D3 | | | | | | | | | D6 | | | | | | | | | D9 | | | | | | | | | ∅ | | | | | | | | |
| | F1x | F2x | F3x | F4x | F5x | F6x | F7x | F8x | F9x | F10x | F11x | F12x | F13x | F14x | F15x | F16x | F17x | F18x | F19x | F20x | F21x | F22x | F23x | F24x | F25x | F26x | F27x | F28x | F29x | F30x | F31x | F32x | F33x | F34x | F35x | F36x |
| | D1 | D2 | D3 | D4 | D5 | D6 | D7 | D8 | D9 | D10 | D11 | D12 | D1 | D2 | D3 | D4 | D5 | D6 | D7 | D8 | D9 | D10 | D11 | D12 | D1 | D2 | D3 | D4 | D5 | D6 | D7 | D8 | D9 | D10 | D11 | D12 |
| C1x | | | | | | | | | | | | | | | | | | | | | | | | | | | | | | | | | | | | |

COMMUNICATION SYSTEM FOR AIRCRAFT

The present invention relates to the field of communication systems for aircraft to enable a communication internal to the aircraft.

BACKGROUND OF THE INVENTION

It is known, for example, from protocol IEEE 802.15.4, which is a wireless network communication protocol, to share between communicating devices needing to send data to a data concentrator, channels, i.e. communication frequency ranges, and transmission time windows.

For this, this protocol proposes to attribute, to each communicating device of a plurality of communicating devices, a communication channel (i.e. a frequency range unique to the channel) and a communication time window, wherein this communicating device is the only one of the devices of the plurality of communicating devices which is authorised to send data over the communication channel which is attributed to it.

The aim of such a sharing of channels and time windows between the devices is to limit the risk of interferences between the data transmitted by the different communicating devices, while maximising the flow rate of data that can be transmitted to the data concentrator.

According to this protocol, to avoid the data concentrator receiving and considering data coming from communicating devices which are not authorised to send it data, each communicating device authorised to communicate with the data concentrator is manually configured and manually paired with the data concentrator which corresponds to it.

At each adding or removing of a communicating device paired with the data concentrator, a manual configuration operation must be implemented.

A manual configuration operation requires the intervention of a technician on the data concentrator and on the devices to be paired, which can require an at least partial shutdown of operation of the communication system.

Such manual configuration operations therefore take time and consume electrical energy (energy necessary for the operation of devices during the configuration) and can generate configuration errors.

For this, this protocol seems incompatible with the needs of a communication system for an aircraft, which requires availability and reliability.

OBJECT OF THE INVENTION

An object of the present invention is to provide a communication system for aircraft making it possible to resolve all or some of the abovementioned problems of the prior art.

SUMMARY OF THE INVENTION

To this end, the invention mainly relates to a communication system for an aircraft, comprising:
- a first data concentrator
- a first plurality of communicating devices, each of these communicating devices being adapted to send data to the first concentrator by wireless transmission, the first concentrator being adapted to process data sent by said communicating devices and received by this first concentrator.

The communication system according to the invention is mainly characterised in that the first concentrator is arranged to broadcast, by wireless transmission, at least one parameterisation signal of at least one operating cycle of the communication system and each given communicating device of the first plurality of communicating devices is arranged to send an identification signal unique to this given communicating device, to the first concentrator (always via a wireless transmission), in response to this at least one parameterisation signal of the cycle, the first concentrator being arranged to broadcast (always via a wireless transmission) one or more assignment signals to assign a plurality of time windows separate from one another, valid for the operating cycle, each time window being assigned to only one of the communicating devices (Di1, Di2) the first concentrator of which has received a unique identification signal and being associated with at least one communication channel belonging to a plurality of communication channels of the wireless transmission, each given communicating device arranged to transmit data intended for the first concentrator via said at least one communication channel associated with the time window assigned to this given communicating device only during this time window (i.e. in an assigned time window which occurs during the parameterised cycle).

For the understanding of the invention, the term "wireless transmission" means a transmission of signals or data via electromagnetic waves, mainly radioelectric waves.

With such a wireless transmission, the transmitted waves move in the space between the communicating devices and the data concentrator(s) without requiring connecting cables connecting each device to the concentrator(s). A wireless transmission is, for example, in a non-limiting manner, of the LoRa type, optionally Wi-Fi or Bluetooth®, but it is also imaginable that the wireless transmission comprises a light wave transmission, as would be the case with a Li-Fi wireless transmission.

Each time window is a communication time window defined for the only communication channel which is associated with it.

The parameterisation signal is a parameterisation signal of at least one cycle which below, is called operating parameterised cycle of the communication system, this at least one cycle is preferably the current operating cycle of the communication system, i.e. the cycle during which the first concentrator broadcasts said at least one parameterisation signal.

The assignment by the first concentrator, to a given communicating device, of a time window associated with a communication channel and dedicated/assigned to this only communicating device is particularly advantageous, as it can be automated while making it possible to avoid collisions between data during the transmission of data of different communicating devices to the first concentrator.

Other advantages of the invention will be presented below in reference to its different embodiments.

The invention also relates to a communication method in an aircraft equipped with a communication system for aircraft, comprising:
- a first data concentrator
- a first plurality of communicating devices, each of these communicating devices being adapted to send data to the first concentrator by wireless transmission, the first concentrator being adapted to process data sent by said communicating devices and received by this first concentrator.

This method is mainly characterised in that:

the first concentrator broadcasts, by wireless transmission, at least one parameterisation signal of at least one operating cycle of the communication system; then each given communicating device of the first plurality of communicating devices sends an identification signal unique to this given communicating device to the first concentrator, in response to this at least one parameterisation signal of the cycle; then the first concentrator broadcasts one or more assignment signals to assign a plurality of time windows separate from one another, valid for the operating cycle, each time window being assigned to only one of the communicating devices, the first concentrator of which has received a unique identification signal and being associated with at least one communication channel of a plurality of communication channels of the wireless transmission; then each given communicating device transmit data intended for the first concentrator, via said at least one communication channel associated with the time window assigned to this given communicating device, these data being transmitted only during said time window assigned to this only given communicating device.

This method has the same advantages as the communication system according to the invention.

According to another aspect, the invention also relates to an aircraft comprising a communication system according to any one of the embodiments of the system according to the invention.

According to another aspect, the invention also relates to an aircraft comprising a communication system implementing the method according to the invention.

BRIEF DESCRIPTION OF THE DRAWINGS

Other features and advantages of the invention will clearly emerge from description below, for information and not-at-all limiting, in reference to the accompanying drawings, wherein:

FIG. 3 illustrates a table giving another example of an assignment to communicating devices Di1, Di2, Di3 to Di10 of communication channels C1, C2, C3 of wireless transmission and of time windows F1, F2, F3, F4, associated with these channels, and of assignment of windows open on events F1X, F2X, F3X, F4X, . . . , F11X, F12X over a common wireless transmission channel C1X assigned to the different communicating devices, in this case, each communicating device which detects an event allocated to its unique time window over the common channel C1X to transmit data to the concentrator K1a, this table shows a case of assignment for a system S1 only comprising one single concentrator K1a receiving data from fifteen communicating devices, any time window not assigned over one of the channels is, in this case, referenced by the empty set symbol "∅";

DETAILED DESCRIPTION OF THE INVENTION

The present invention relates to the field of data transmission in one same aircraft via a wireless transmission.

The communicating devices form a fleet of objects and, in this sense, the present invention can use communication protocols of the field of the internet of things "IOT", which are usually not very well adapted to the field of intra-aircraft data transmission. In this sense, the present invention is particularly economical to implement, while enabling rules unique to aeronautics to be respected.

As will be seen below, this invention is particularly advantageous for collecting various data relating to equipment of the aircraft, like its passenger seats, its wheels, or other equipment.

In reference to FIGS. 1 to 5, the invention mainly relates to a communication system S1 for an aircraft a (this communication system is arranged to perform communication internal to a given aircraft).

This system S1 comprises:
a first data concentrator K1a and optionally several data concentrators K2a, K3a; and
a first plurality of communicating devices Di1, Di2, Di3, . . . , DiX, DiY, DiZ, each of these communicating devices being adapted to send, by wireless transmission, data to the first concentrator K1a or to another of the concentrators.

The following description focuses on the exchanges between the first concentrator and communicating devices of the first plurality of devices, but the same features are applicable for exchanges between some of the devices of the first plurality and other data concentrators of the system.

Each given concentrator embedded on the aircraft, in this case, the first concentrator K1a, is arranged to process the data that it receives, via the wireless transmission, from the communicating devices of the first plurality of communicating devices.

Such a data processing can comprise a recording of these data and/or an analysis, for example a comparison and/or a retransmission to one or more other elements of the communication system of the aircraft, such as a processor of the aircraft, a flight recorder of the aircraft or to an elements external to the communication system of the aircraft, such as a receiver on the ground or a receiver embedded on another aircraft.

Thus, the first concentrator K1a comprises, in a manner known per se, a radioelectric signal transceiver connected to an electronic circuit adapted/arranged to process data sent by said communicating devices and received by this first concentrator.

The first concentrator K1a is also arranged to broadcast, by wireless transmission, at least one parameterisation signal S0 of at least one operating cycle of the communication system S1.

This is the same for each of the other data concentrators K2a, K3a.

Each given communicating device Di1, Di2, Di3, ..., DiX, DiY, DiZ of the first plurality of communicating devices is arranged to send to the concentrator to which it is assigned, in this case, the first concentrator K1a, in response to this at least one parameterisation signal S0 of the cycle, an identification signal unique to this given communicating device. In this case, each communicating device sends one single identification signal which is unique to it. In the example illustrated by FIG. 1, the communicating device Di1 transmits its unique identification signal Id1 and the communicating device Di2 transmits its unique identification signal Id2. Each communicating device has a structure known per se and comprises a radioelectric signal transceiver connected to an electronic circuit adapted/arranged to process data sent and received.

Each identification signal of a given communicating device is unique, i.e. that each identification signal of one of the communicating devices contains an identifier unique to this signal and unique among all the identifiers of the communicating devices of the communication system.

The first concentrator K1a is arranged to broadcast one or more assignment signals to assign a plurality of time windows separate from one another, valid at least for the operating cycle. In this case, in the example of FIG. 1, two assignment signals J1, J2 are broadcast by the first concentrator K1a to assign a window F1. The signal J1 is intended for the device Di1 to assign it the time window F1. The signal J2 is, in this case, intended for the device Di2 in order to assign it a time window. In this example, the same window F1 is assigned to the two devices Di1, Di2, but the window F1 could also be assigned to the only device Di1 and another time window F2 to the other device Di2. As will be seen below, it can be decided that a given window is assigned to only one of the devices, or on the contrary, that one same time window is assigned to several communicating devices. Likewise, a given assignment signal can be used to assign several windows to one same device.

In a particular embodiment, it can be ensured that each assigned time window is assigned to only one of the communicating devices Di1, Di2 the first concentrator K1a of which has received a unique identification signal and is assigned to at least one communication channel chosen from a plurality of communication channels of the wireless transmission.

Naturally, in other embodiments, it could be ensured that at least some of the time windows are assigned to several devices. In this case, it can preferably be ensured that the channels are assigned, such that there is unique pair per device formed of a given window and of a given channel. This makes it possible to avoid a risk of collision during data transmission.

Figure 2:
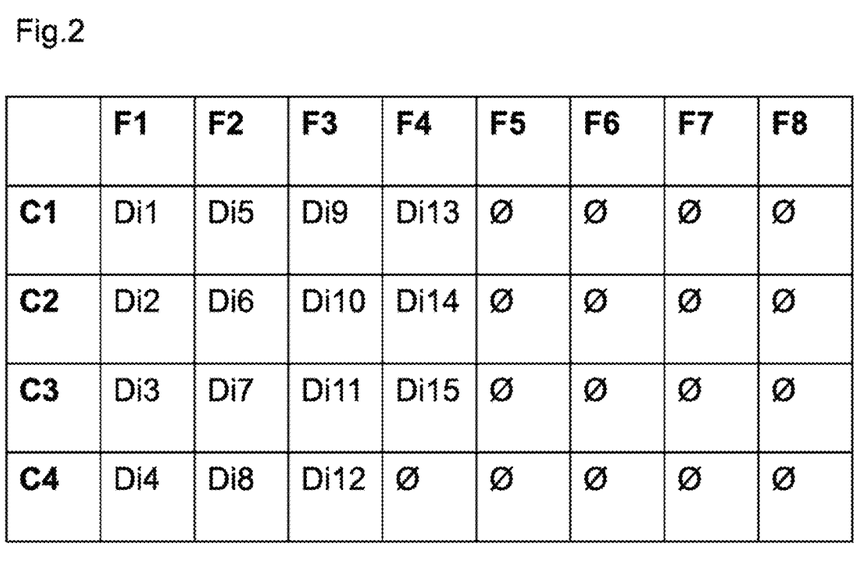
FIG. 2 illustrates a table giving an example of an assignment to communicating devices Di1, Di2, Di3, until Di15 of communication channels C1, C2, C3, C4 of wireless transmission and of time windows F1, F2, F3, F4, F5, F6, F7, F8 associated with these channels, this table showing a case of assignment for a system only comprising one single concentrator K1a receiving data from fifteen communicating devices, the time windows not assigned over one of the channels being referenced by the empty set symbol "∅"

In the example illustrated in FIG. 2, there is a plurality of time windows F1 to F8 and a plurality of channels comprises the channels C1, C2, C3, C4 and a plurality of devices Di1 to Di15, to each given device is assigned a unique pair formed of a window and a channel. In this example, the pair consisting of the window F1 and of the channel C1 is assigned to the device Di1, the pair F1/C2 is assigned to the device Di2 and the pair F2/C1 is assigned to the device Di5.

Figure 1:
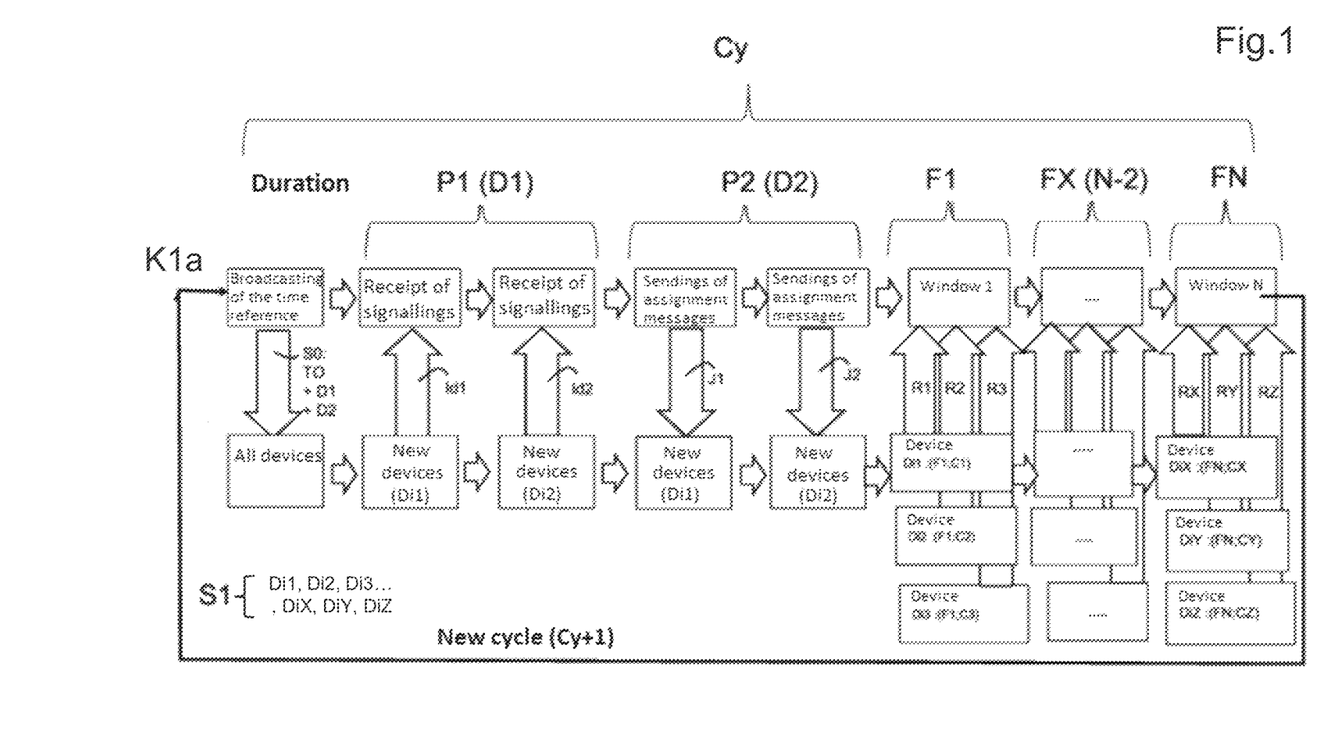
FIG. 1 illustrates the occurrence of an operating cycle Cy of the communication system according to the invention (this cycle Cy is the cycle parameterised by at least one parameterisation signal, this is, in this case, the current cycle, the cycle following this cycle Cy being a new cycle referenced Cy+1) enabling the enrolment, the parameterisation of the communicating devices Di1, Di2, Di3, DiX, DiY, DiZ needing to respectively transmit data R1, R2, R3, RX, RY, RZ to the first data concentrator K1a only via assigned time windows and over channels respectively associated with these windows.

As can be understood from the example illustrated in FIG. 1, each given communicating device Di1, Di2, Di3, ..., DiX, DiY, DiZ is also arranged to transmit data R1, R2, R3, ..., RX, RY, RZ intended for the concentrator to which it is assigned, via said at least one communication channel and the time window which are assigned to this given communicating device and only during the time window thus assigned.

In this example, all the devices Di1, Di2, Di3, ..., DiX, DiY, DiZ are assigned to one same concentrator K1a. The device Di1 transmits its data R1 to the concentrator K1a via F1 and the channel C1 which are assigned to it. The device DiZ transmits its data RZ to the concentrator K1a via FN and the channel CZ which are assigned to it.

This invention enables the different communicating devices to send data to one same or more concentrators via one same channel or via several wireless transmission communication channels, while removing the risk of collision of these data since, on a given channel, each communicating device can only transmit during one or more time windows which is/are assigned to this only communicating device.

Figure 5:
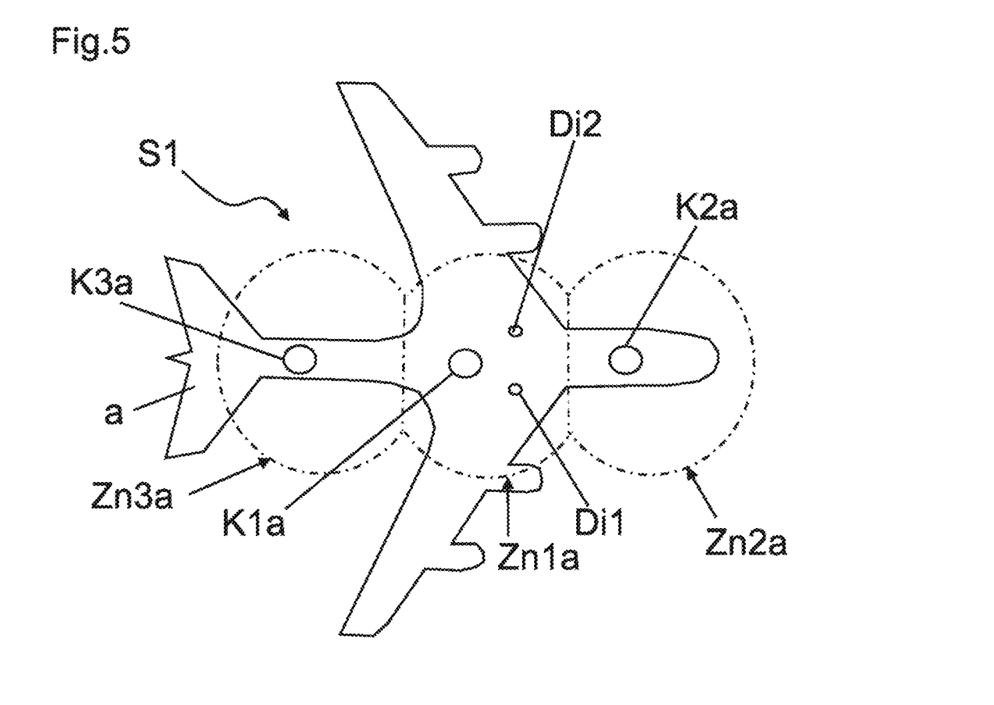
FIG. 5 illustrates a spatial segregation diagram for managing the case where the aircraft a is equipped with a communication system S1 according to the invention comprising several data concentrators K1a, K2a, K3a embedded on the aircraft a (this is particularly useful in the case of a large aircraft to limit the power of the signals necessary for the wireless communication and/or to manage a very large number of embedded communicating devices), in this case, each concentrator K1a, K2a, K3a defines its unique spatial segregation zone Zn1a, Zn2a, Zn3a, each concentrator K1a, K2a, K3a only considering data transmitted by communicating devices located in its unique segregation zone, these segregation zones being separate from one another, i.e. that they do not overlap.

It is therefore the data concentrator(s) which, by assigning the windows to the different devices, set time and frequency segregation rules for data transmission to the data concentrator(s) (in the example of FIG. 5, the data from the different devices can be transmitted without risk of collision to three K1a, K2a, K3a).

Apart from the case of the common channel C1X which will be presented below, each concentrator assigns the windows to the communicating devices, such that each assigned time window associated with a given channel is only assigned to only one of said communicating devices.

Ideally, each communicating device Di1, Di2, Di3, ..., DiX, DiY, DiZ has its unique memory to memorise events in it, that it detects or the features that it measures before transmitting them to the corresponding data concentrator via the sending of data.

Likewise, each communicating device Di1, Di2, Di3, ..., DiX, DiY, DiZ is equipped with its unique communication means (antenna, network card or other) adapted to enabling the exchange of data signals from and to the communicating device and via the wireless transmission.

Each concentrator is also equipped with its unique communication means or, as a minimum, operationally connected to the communication means external to the concentrator. Such communication means comprise, for example, one or more antennas and one or more network cards adapted to enable the exchange of signals and data from and to this concentrator and via the wireless transmission.

The first concentrator K1a is preferably arranged to associate each time window that it assigns with said at least one communication channel of the plurality of channels and this association is defined by parameters contained in the assignment signal(s). In this case, the assignment signal J1 is intended for the device Di1, the signal J2 is intended for the device Di2. For a device referenced DiX, there would be an assignment signal JX.

The time windows associated with one same channel are defined so as to form a succession of windows separate from one another, i.e. that they do not overlap over time.

Each of these time windows is defined to occur during said at least one operating cycle of the system, i.e. at least the cycle parameterised by the parameterisation signal S0 of a cycle, and to be valid for a given communication channel.

Each given communicating device is arranged to interpret the assignment signal(s) that it receives and which comprise the association rules which correspond to this given communicating device.

Thus, each given communicating device interprets the assignment signal(s) which correspond to it, and which indicate the time window(s) which is/are assigned to it to transmit data R1, R2, R3, . . . , RX, RY, RZ intended for the first concentrator K1a on said at least one associated communication channel C1.

Then, according to this interpretation of the assignment signal(s), the given communicating device transmits the data intended for the concentrator, which corresponds to it via the channel associated with the time window and only during the time window(s) Fx assigned to this given communicating device.

More specifically, each given communicating device is:
on the one hand, arranged to await the start of this at least one time window which is assigned to it for this parameterised cycle and which is associated with a given communication channel before starting to send data to the first concentrator via this associated communication channel; and
on the other hand, arranged to stop sending these data via this same assigned communication channel, at the end of this at least one time window which is assigned to it.

Outside of the time window which is assigned to it, each given communicating device remains silent on the associated communication channel which is assigned to it.

Thus, it is certain that the data sent by several of the communicating devices, via one same given communication channel assigned to these different communicating devices, do not overlap.

In order to program the timing of the cycles and of the communicating devices of the system S1, said first data concentrator K1a (and preferably each of the other concentrators) is operationally linked to a first oscillator to measure an elapsed time and said at least one cycle parameterisation signal S0 contains a time reference T0.

For example, the time reference T0 can be unique to this parameterised cycle, it can be an absolute time or simply a parameterised cycle starting signal (i.e. a "starting top" for the parameterised cycle, in this case, the current cycle).

The first oscillator is, in this case, used to generate the time reference T0 and to count an elapsed duration, like the duration D2 of the second time range P2.

Always for timing the system S1, each given communicating device Di1, Di2, . . . , DiX, DiY, DiZ comprises an oscillator which is unique to it, and which is arranged to estimate an elapsed time duration from the receipt of said time reference T0 by this given communicating device.

The oscillator of a given communicating device must make it possible to estimate a duration autonomously over at least one complete cycle and preferably over several consecutive operating cycles of the system.

For this, each given communicating device is arranged to use the time reference T0 that it receives, to adjust one or more adjustable parameters of the device to improve its accuracy and the synchronisation between the different elements of the system.

Ideally, this adjustment must make it possible to maintain a time offset less than 1 ms per operating cycle of the system.

This operating method is particularly effective to reduce the energy consumption of the communicating device while making it possible to use a not-very-accurate and therefore cheaper oscillator.

Preferably, at least some of the concentrators are supplied with energy by the power supply network of the aircraft. The others comprise an energy supply source which is unique to them and which delivers an electric energy, necessary for their operation.

Each given communicating device Di1, Di2, Di3, . . . , DiX, DiY, DiZ comprises an electric energy power source which is unique to it and which delivers an electric energy, necessary for the operation of this given communicating device.

Such a power source can be a battery or an accumulator or any other autonomous source over several cycles. It could also be provided that at least some of the communicating devices are connected to the power supply network of the aircraft.

However, it will be preferred that the communicating devices can operate in energy autonomy without having to be connected to the power supply network of the aircraft By operation of the communicating device, this means that each given communicating device uses the electric energy delivered by its power source to execute each of the functions for which it is arranged/adapted.

In this case, during its operation, the communicating device uses this energy to receive signals broadcast by the first data concentrator, estimate an elapsed time duration, measure features and/or detect events, send signals, like its identification signal, send data to the first data concentrator K1a or to any other data concentrator which corresponds to it, at least some of these data being representative of the features measured and/or events detected by this given communicating device Di1, Di2, Di3, . . . , DiX, DiY, DiZ.

A communicating device generally transmits, via the time window which is assigned to it over a given channel, regular-type data which are transmitted at regular time intervals.

As will be seen below, regular-type data are, for example, data relating to measurements regularly taken by a sensor of the communicating device, like a temperature, pressure, electric voltage, electric intensity, mechanical force, physical state measurement.

Typically, the data sent by at least some of the communicating devices can be measurements taken by a sensor, these measurements being preferably comprised in the group of measurements comprising a measurement of at least one physical feature unique to a given seat of the aircraft, a measurement of at least one physical feature unique to a given wheel of the aircraft (naturally, this could also be a measurement of a physical feature unique to another element of the aircraft), an aircraft seat deformation measurement (taken with a seat deformation sensor associated with a communicating device which corresponds to it), an aircraft seat position measurement (taken with a position sensor integrated with a seat of the aircraft and associated with a communicating device which corresponds to it), a pressure measurement (taken with at least one pressure sensor integrated with a wheel or tyre of the aircraft and associated with a communicating device which corresponds to it), a temperature measurement (taken with at least one temperature sensor integrated with an aircraft seat or with a wheel of tyre of the aircraft and associated with a communicating device which corresponds to it).

The operation of the communication system according to the invention will now be presented in detail, in reference to FIG. 1.

As can be understood from FIG. 1:
said at least one cycle parameterisation signal S0 is sent by the concentrator at the start of the parameterised cycle, this signal S0 contains a first parameter of duration D1 unique to the parameterised cycle (in this case, the parameterised cycle is the current cycle) and a second parameter of duration D2 unique to the parameterised cycle;
the communicating devices are arranged to send, to the first concentrator K1a, their respective identification signals, for example Id1 or Id2 during a first time range P1 of parameterisation of the cycle which is defined according to said first parameter of duration D1 (in this case, the first time range P1 has a value duration D1); and
said concentrator K1a is arranged to await the start of a second time range P2 of parameterisation of the cycle which is immediately after said first time range P1 of parameterisation of the cycle which is defined according to said second parameter of duration D2 (in this case, the second time range P2 has a value duration D2) to broadcast for each device signalling an assignment signal, for example J1 or J2 containing assignment parameters, each given assignment parameter associating with each given communicating device Di1, Di2, . . . , DiX, DiY, DiZ, said at least one time window assigned F1, F2, . . . , FN to this given communicating device Di1, Di2, . . . , DiX, DiY, DiZ and associated with a given communication channel.

As is illustrated in FIG. 1, the data concentrator K1a (like any other data concentrator) transmits several assignment signals, each of these assignment signals being dedicated to only one of the communicating devices.

The first parameter of duration D1 can be determined by the first concentrator according to a number of communicating devices having transmitted identification signals during preceding cycles (i.e. cycles prior to the parameterised cycle) and/or according to the number of communicating devices having transmitted data during one or more operating cycles prior to the current cycle.

The second parameter of duration D2 can be calculated according to the duration D1 and/or according to the number of communicating devices having sent their identification signals during the parameterised cycle.

It must be noted that the identification signals can be transmitted via a so-called "marker" path, in this case, this transmission could always be done via one same communication channel for all the devices or via a channel selected randomly from among a plurality of predefined channels with optionally a random time offset per device, such that it transmits its identification signal (thus, the risk of collision is avoided between the identification signals Id1, Id2 . . . ).

As the case may be, the first concentrator Ak1 is arranged to receive the identification signals Id1, Id2 . . . via only one or more channels.

Preferably, each given communicating device Di1, Di2, Di3, . . . , DiX, DiY, DiZ of the first plurality of communicating devices is arranged to select a communication channel of said (predefined) plurality of communication channels C1, C2, C3, C4, . . . , CX, CY, CZ and to use this selected communication channel to send its unique identification signal, for example Id1 or Id2 to the first concentrator K1a.

This makes it possible to reduce the time necessary for the communication of different identification signals since they can be sent simultaneously via several channels. Alternatively, it would be possible to provide that all the identification signals are transmitted via only one and same communication channel.

In a particular embodiment, each given communicating device Di1, Di2, Di3, . . . , DiX, DiY, DiZ of the first plurality of communicating devices is arranged to perform said selection of communication channel C1, C2, C3, C4, . . . , CX, CY, CZ using a random channel selection function.

In other words, the channel is, in this case, selected randomly from among the plurality of predefined communication channels C1, C2, C3, C4, . . . , CX, CY, CZ. The probability of collision is thus reduced between identification signals.

Always to limit the risk of collision during the transmission of the signalling signals, it can be ensured that each given communicating device Di1, Di2, Di3, . . . , DiX, DiY, DiZ of the first plurality of communicating devices is arranged to detect if the channel selected to send the identification signal is in use by another of said communicating devices and to send its unique identification signal to the first concentrator K1a via this channel selected only when none of the other communicating devices Di1, Di2, Di3, . . . , DiX, DiY, DiZ uses this selected channel.

It is also possible for it to be ensured that each given communicating device Di1, Di2, Di3, . . . , DiX, DiY, DiZ of the first plurality of communicating devices is arranged to count a duration and to start the sending of its unique identification signal after the counted duration is equal to a random value of between a predetermined minimum duration and a predetermined maximum duration.

Thus, as the communicating devices transmit their identification signals at random times chosen during the first time range P1, the risk of collision during the declaration of the identification signals is avoided.

Such that a failing device uselessly does not occupy a time window which has been assigned to it beforehand with the associated channel, it can be provided that the first concentrator is arranged to: when a communicating device has transmitted no data via a time window during a whole number of successive operating cycles, assigning said time window to another communicating device, and the associated communication channel, for a plurality of successive operating cycles of the system.

The whole number of cycles can be equal to or greater than 1.

If this number of cycles is 1, this means that the first concentrator will reassign said time window for the current cycle, if no data has been transmitted via this window during the cycle preceding the current cycle.

If the whole number is 2, this means that over the two cycles which precede the current cycle, no data has been received during the time window.

It is moreover possible that the first concentrator is arranged to detect a failure of a given communicating device if this device has not transmitted data during one or more cycles which precede the current cycle. In such a situation, the concentrator generates failure information indicating that this communicating device is potentially defective. This greatly facilitates the maintenance operations of the system according to the invention.

Figure 4:
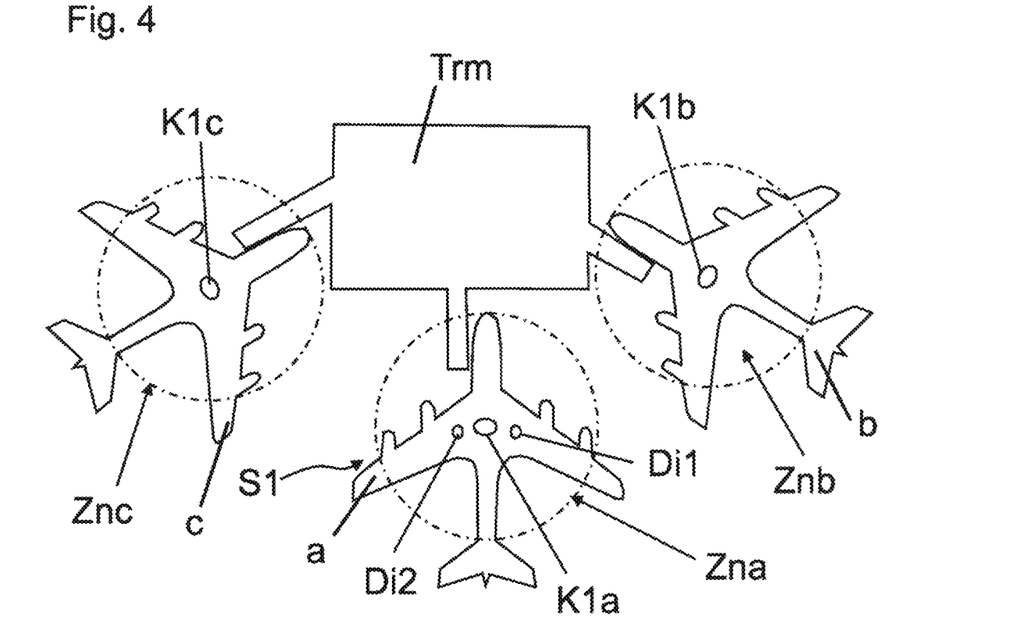
FIG. 4 illustrates a spatial segregation diagram for managing a case where several aircrafts a, b, c are side by side, these aircrafts are in the parking area in front of an airport terminal Trm, it is observed that each of these apparatuses a, b, c is equipped with its unique communication system S1 according to the invention and its unique data concentrator(s) K1a, K1b, K1c and its unique communicating device(s) Di1, Di2, each concentrator defining a spatial segregation zone Zna, Znb, Znc which is unique to it, each concentrator being arranged to only consider data transmitted by communicating devices located in its unique segregation zone which only contains devices embedded on the aircraft with the concentrator.

Preferably, in reference to FIGS. 4 and 5, the communication system S1 comprises a distance estimation module to estimate for each given communicating device, for example Di1 or Di2, the first concentrator of which has received an identification signal, a distance value of this given communicating device vis-à-vis said first concentrator K1a.

This distance estimation module is preferably operationally connected to said first concentrator to transmit the estimated distance values of each of these given communicating devices to it.

Said first data concentrator is preferably arranged such that according to these estimated distance values, this first concentrator identifies those of the communicating devices located in a segregation zone Zna unique to this first data concentrator K1a and to only send the assignment signal(s), for example J1 or J2, to the communicating devices located in this segregation zone Zna.

The distance estimation module can be arranged to estimate a distance value according to an observed propagation time of the data via this channel.

The propagation time is generally given by a communication means managing the wireless transmission.

For example, in the case of a 2.4 GHz LoRa-type communication means, this communication time is delivered, thanks to a chip having the reference SX1280.

It is naturally possible to use one or more distance estimation modules arranged to calculate the distances from the devices vis-à-vis one or more of the concentrators of the system by a triangulation calculation and/or a trilateration calculation.

In the latter case, several antennas of the system, spaced apart from one another, can capture one same identification signal of a given communicating device and according to the time offsets observed between the times of receiving this signal by each of these antennas, and according to the respective known positions of each of these antennas in the aircraft, the triangulation or trilateration calculation is thus possible for determining the spatial position of this communicating device vis-à-vis these antennas.

Knowing the respective positions of the different concentrators in the aircraft, the respective positions of each of these antennas in the aircraft and the spatial position of this communicating device vis-à-vis the antennas, the position of the device is deduced vis-à-vis each of the concentrators and consequently, the distance values of this communicating device vis-à-vis each of these concentrators. This makes it possible to assign each device to the closest concentrator from among the concentrators K1a, K2a, K3a.

Preferably, in reference to FIG. 4, the system S1 can comprise, in addition to said first data concentrator K1a, several other data concentrator K2a, K3a.

In this case, the distance estimation module is arranged to estimate, for each communicating device, at least one distance value between this communicating device and at least one of said data concentrators K1a, K2a, K3a.

The system S1 comprises, in this case, an assignment module (not represented) which is arranged to, according to the distance values estimated between the communicating devices and the concentrators, assign each of the communicating devices of the first plurality of communicating devices to only one of these data concentrators K1a, K2a, K3a and each of these communicating devices being arranged to only transmit data to the concentrator to which it is assigned.

Preferably, these data concentrators K1a, K2a, K3a, are connected to one another via a communication network of the aircraft, which is preferably of the wireless transmission type, but which could be of the wire transmission type.

In the case where one same identification signal Id1 of a given communicating device is received by several of the concentrators of the system, then an arbitration is performed by the assignment module to assign the device to only one of the concentrators.

According to the respective distance values of this given communicating device vis-à-vis each of the concentrators K1a, K2a, K3a, then the assignment module assigns this given communicating device to the concentrator having the lowest distance value vis-à-vis this given device.

This given device is thus assigned to only one concentrator and will depend on the spatial segregation zone of this only concentrator.

Each concentrator only transmits its or their assignment signals to the communicating devices which are assigned to it, i.e. which are comprised in its segregation zone.

The pairing of a communicating device will always therefore be done with the closest concentrator and there is therefore no risk such that one same device is assigned to several concentrators. The concentrators are arranged to ignore the signals from the communicating devices located outside of its zone, and conversely.

Always to limit the risk of collision, in the case where the system according to the invention comprises several concentrators, these concentrators are arranged to communicate with one another, for example via the aircraft network or a specific channel of the wireless transmission, such that the operating cycle of the system is cut into several successive time periods.

Each of these given time periods is dedicated to the transfers of signals and of data from and to only one of said concentrators assigned to this given time period.

In this case, over a given time period dedicated to only one of the concentrators of the system, only this concentrator transmits its parameterisation signal, only this concentrator receives the respective data identification signals sent by the communicating devices of the plurality of communicating devices and, optionally only this concentrator transmits its or their assignment signals.

This concentrator is moreover programmed to not transmit any signal, as long as the time periods allocated to the other concentrators of the system are not yet completely elapsed.

Thus, each of the concentrators can exchange with communicating devices to make it possible to parameterise them at least partially during a time period which is dedicated to it, and during which the other concentrators remain silent.

Conflicts of signals or data are thus avoided during the parameterisation and until the channels and windows are assigned to the different communicating devices and different concentrators.

Once these assignments of channels and windows have been performed, the data from the communicating devices can be transmitted over one same time range, respecting channels and windows respectively assigned by the different concentrators.

Thus, during a complete operating cycle of the system, the concentrators can parameterise the devices, the devices can be assigned to the different devices and the communicating devices can send their data R1, R2, R3, . . . , RX, RY, RZ with a very low risk of collision.

According to a particular embodiment, the first concentrator K1a (like any of the other concentrators) can be arranged to receive, via a communication channel C1x common to several of the communicating devices Di1, Di2, Di3, . . . , DiX, DiY, DiZ of the first plurality of communicating devices, of data R1, R2, R3, . . . , RX, RY, RZ sent by these communicating devices and each of these communicating devices being:
- on the one hand, arranged to detect if the common communication channel C1x is in use by another of the communicating devices (Di1, Di2, Di3, . . . , DiX, DiY, DiZ); and
- on the other hand, arranged to send data to said first data concentrator (K1a) via this common communication channel (C1x), only when none of the other communicating devices Di1, Di2, Di3, . . . , DiX, DiY, DiZ uses this common communication channel C1x.

Such a common channel C1x belongs to the plurality of channels of the wireless transmission, but it is preferably used to send data relating to irregular/punctual events detected by the communicating devices.

Thus, if a communicating device detects an event, it can signal it without awaiting the end of the current cycle, as soon as the common channel C1x is free.

This makes it possible to reduce the data transmission delay relating to an irregular event.

In this embodiment, each given communicating device sending data to the first concentrator via the common channel C1x is of the on-event communicating type.

Each on-event communicating type device is arranged to define the time window F1x, F2x, F3x unique to this given communicating device for this common channel C1x, when it detects:
- on the one hand, that at least one item of data to be sent to the first concentrator K1a is stored in a memory zone unique to this given communicating device; and that
- on the other hand, no other communicating device of the on-event communicating type does not transmit over this common channel C1x.

An on-event-type communicating device generally transmits irregular-type data, such a data transmission being triggered by the detection of an event (for example, one or more punctual events) by at least one sensor of the communicating device of the second type.

The on-event-type communicating device, using its or their sensor(s), detects the event and generates an item of data in a memory zone of this device, then it searches to identify if the common channel C1x is available (i.e. that no data is in transmission over this channel C1x) to send this data.

If no other device transmits over this common channel C1x, then this device of the second type creates its unique time window or uses a time window that is still free and predefined by a window configuration parameter for this common channel C1x. This window configuration parameter of the channel C1x can, for example, have been transmitted via the configuration signal S0, for example at the start of the current cycle.

The sending of the irregular-type item of data, stored beforehand in the memory zone, is thus triggered by the on-event-type communicating device.

This triggering can be immediate or postponed after the elapsing of a random duration estimated using the oscillator of the communicating device.

This is advantageous in the case where several events are detected simultaneously by several devices of the second type, to avoid the risk that the irregular-type data transmitted by these communicating devices do not collide in one same window of the common channel C1x.

Figure 3:
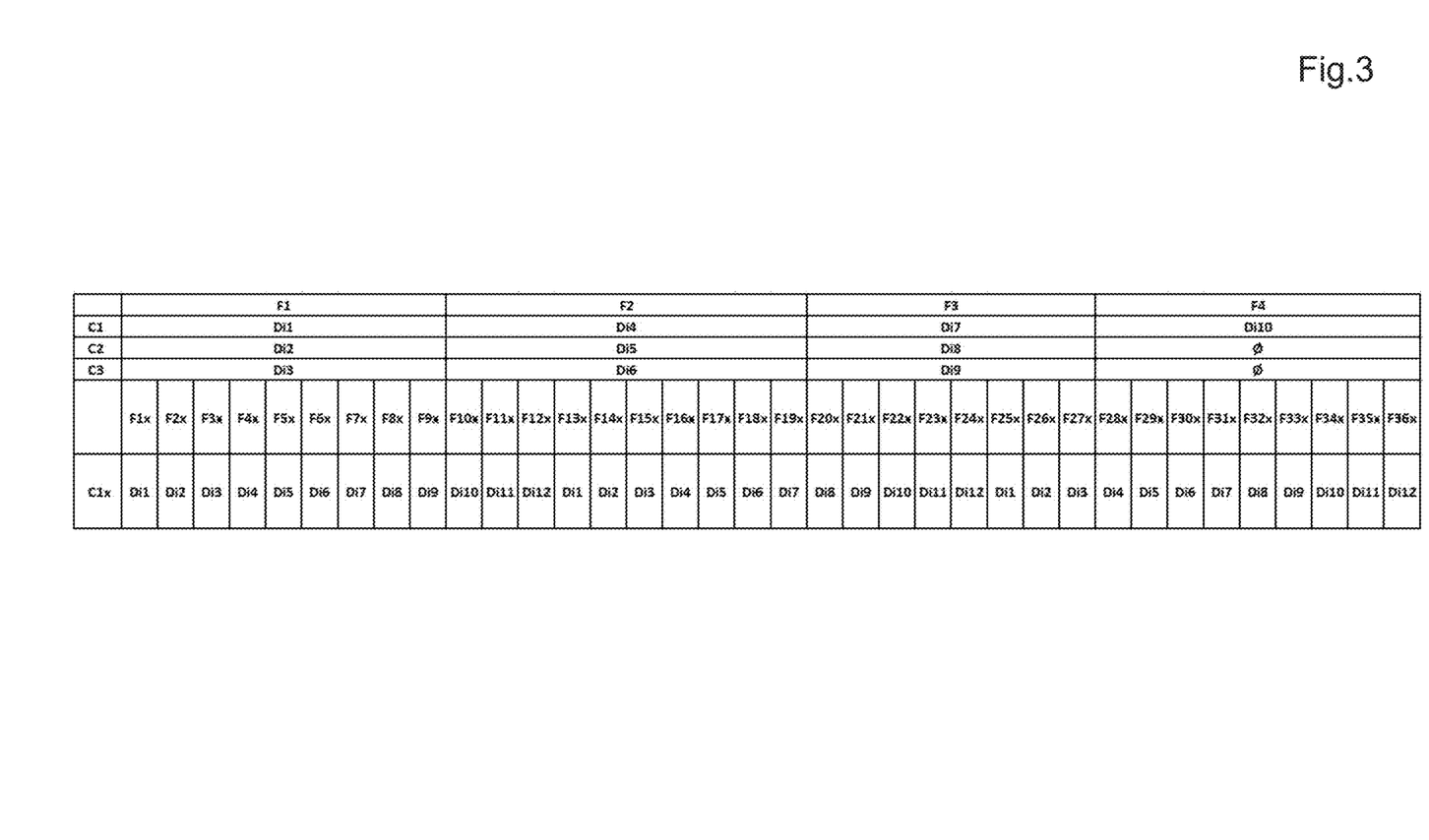

Naturally, the concentrator can be arranged to transmit assignment signals to at least some of the devices, assigning to each given device, one of the time windows (in the example of FIG. 3, for the common channel C1x, the time window F1x is assigned for the device Di1, the window F2x is assigned to the device Di2).

In this embodiment, each given device is arranged to transmit data (typically irregular-type data) via the common channel C1x only during the time window which is assigned to it for this common channel C1x.

This embodiment makes it possible to not have to detect the use of the common communication channel C1x by another of the communicating devices.

This is economical from an energy standpoint since, for this common channel C1x, each given device can remain on standby over all the periods outside of the time window which has been assigned to it.

The concentrator which is arranged to listen to several channels simultaneously can thus:
- on the one hand, receive regular-type data transmitted via one or more channels C1, C2, C3 . . . CX, CY, CZ assigned to several devices Di1, Di2, Di3, . . . DiX, DiY, DiZ and via the corresponding time windows F1, . . . , FX, FX(N−1), FN, assigned beforehand by this first concentrator K1a; and
- on the other hand, receive irregular-type data transmitted via a common channel C1x to several of the on-event-type communicating devices, each of these devices themselves choosing (as explained above) the time window to be used over this common channel C1x.

Irregular-type data are, for example, data relating to an event, like the passage of a predetermined pressure, temperature, electric voltage, electric intensity, position, mechanical force, physical state threshold. For example, when the communicating device is positioned on a tyre of the aircraft, the event can be a drop in pressure under a given threshold or an increase in pressure beyond a given threshold or an exceeding of a maximum temperature of the tyre.

When the communicating device is positioned on a seat of the aircraft, the event can be a detection of passenger presence on the seat or absence of passenger on the seat, or a safety belt closing state, or lowered position or raised position of the seat or lowered position of the tray table or raised position of the tray table (for some flight phases, like landing and take-off phases, the seats and the tray tables must be in the raised position) or exceeding a sitting duration that is too long (to, for example, suggest to the passenger to perform exercises or alert the flight crew).

In the case where the communicating device measures a feature on a seat, it can measure the weight supported by the seat (to, for example, refine the current distribution of masses in the aircraft) or features of movements or of temperature of the seat (for example, textile temperature)/of the passenger or passenger circulatory features, like their heartbeats or their blood pressure.

All this information can be useful to estimate a passenger state of stress and evaluate the passenger comfort during the flight. All these measurements and event detections make it possible to best evaluate the conditions in the aircraft in real time, which greatly facilitates the work of the flight crew, while making it possible to study these flight conditions afterwards.

It must be noted that the number of channels C1, C2, C3, C4 ... CX, CY, CZ and/or of windows F1, F2, F3, F4 and/or the size of the channels and/or the size of the windows can be parameterised by the concentrator(s) to maximise certain operating features of the system S1 like its communication speed, the transmissible flow rate of data, the maximum number of communicating devices which could communicate with the same concentrator. Thus, the size of the windows and/or of the channels can be variable from one cycle to the other.

In the case of a LoRa communication protocol, the channels have a fixed size, only the size and the number of channels and/or the number of windows being able to be adjusted.

It must also be noted that in the embodiments of the system S1 having several concentrators, the window, channel and communicating device assignment rules can be made so as to maximise some of said operating features of the system S1.

With the same aim, a variation in frequencies of frequency ranges dedicated to the channels can be planned.

It can also be provided that one same channel is dedicated to the transmission of data to only one and unique concentrator.

It can also be provided that the channels and/or windows attributed to one same concentrator change from one cycle to the other to maximise at least one of said operating feature of the system.

It can also be provided that the channels and the windows are associated with one another according to the load balancing rules between data concentrators or collision risk or data transmission error minimisation rules.

It must be noted that the parameterisation signal S0 of a cycle is, in this case, applicable for a cycle, which is preferably a current cycle, but it could be applicable for one or more consecutive cycles to come, including or not the current cycle.

It is however preferred that this parameterisation signal S0 is applicable only to the current cycle, as this improves the responsiveness of the communication system S1 and its capacity to rapidly enroll or exclude a new communicating device without awaiting the end of the current cycle.

In the case where, as in FIG. 5, the communication system S1 for an aircraft comprises several concentrators K1a, K2b, K3c, it can be ensured that each concentrator transmits its unique time reference T0, the time references T0 of each of these concentrators being transmitted in turn, while being synchronised/retimed with one another via a communication between these concentrators, such that their respective oscillators are regularly synchronised, for example, using a main oscillator of the system.

In this embodiment, the time references T0 sent by the different concentrators are coherent with one another, and this, even if these concentrators do not transmit at the same time, to avoid collisions.

This embodiment makes it possible to retime all of the oscillators of the communicating devices of the system around a main time reference of the system S1.

In at least some of its embodiments, the present invention makes it possible to:
program the windows in a centralised manner to limit the waiting times between the assigned windows and thus remove the useless waits to optimise the available bandwidth;
guarantee the possibility for each device to regularly communicate on one or more dedicated windows;
enable a low energy consumption and an increase in autonomy of the devices, since each communicating device can be programmed to put at least some of its functionalities on standby, as soon as a channel and a window has been assigned to it, and to reactivate (in a timed manner) these functions only to be able to transmit data during the window(s) which are assigned to it;
segregate the transmissions of communication systems belonging to neighbouring aircrafts;
guarantee the possibility for each device to communicate during the current cycle, when it detects an event, without having to await a new operating cycle of the system (irregular communications);
limit the need to route each message containing data sent by a communicating device (the channels and windows being assigned at the start of the cycle);
rapidly integrate a new communicating device with the system, this integration being automated;
limit the risk of collision during the transmission of data by the communicating devices;
the possibility to reserve one or more channels to transmit irregular-type data following an event detection;
limit to the maximum, the need for technicians to intervene.

Each communicating device only transmitting during a time window which is attributed to it, in the plurality of the communicating devices, there are not two simultaneous transmissions which enables a facilitated running of transmission constraints in an aircraft (DO-160—"Environmental Conditions and Test Procedures for Airborne Equipment Radio Technical Commission for Aeronautics (RICA)" and ED-14

"Environmental Conditions and Test Procedures for Airborne Equipment European Organisation for Civil Aviation Equipment (EUROCAE)").

The invention claimed is:
1. A communication system for an aircraft, comprising:
a first data concentrator
a first plurality of communicating devices, each of these communicating devices being adapted to send data to the first concentrator by wireless transmission, the first concentrator being adapted to process data sent by said communicating devices and received by this first concentrator, wherein the first concentrator is arranged to broadcast, by wireless transmission, at least one parameterisation signal of at least one operating cycle of the communication system and each given communicating device of the first plurality of communicating devices is arranged to send to the first concentrator, in response to this at least one parameterisation signal of the cycle, an identification signal unique to this given communicating device, the first concentrator being arranged to broadcast one or more assignment signals to assign a plurality of time windows separate from one another, valid for the operating cycle, each time window being assigned to only one of the communicating devices, the first concentrator of which has received a unique identification signal and being associated with at least one communication channel of a plurality of communication channels of the wireless transmission, each given communicating device being arranged to transmit data intended for the first concentrator via said at least one communication channel associated with the time window assigned to this given communicating device only during this time window.

2. The communication system for an aircraft according to claim 1, wherein:
   said at least one cycle parameterisation signal contains a first parameter of duration unique to the parameterised cycle (in this case, the current cycle) and a second parameter of duration unique to the parameterised cycle;
   the communicating devices being arranged to send their respective identification signals to the first concentrator, during a first time range of parameterisation of the cycle which is defined according to said first parameter of duration; and
   said first concentrator being arranged to await the start of a second time range of parameterisation of the cycle which is after said first time range of parameterisation of the cycle and which is defined according to said second parameter of duration to broadcast at least one assignment signal containing assignment parameters, each given assignment parameter associated to each given communicating device, said at least one time window assigned to this given communicating device and associated with a given communication channel.

3. The communication system for an aircraft according to claim 1, wherein said first data concentrator is operationally linked to a first oscillator to measure an elapsed time, said at least one cycle parameterisation signal containing a time reference and each given communicating device comprising an oscillator which is unique to it and which is arranged to estimate an elapsed time duration from the receipt of said time reference by this given communicating device.

4. The communication system for an aircraft according to claim 1, wherein each given communicating device comprises an electric energy power source which is unique to it, and which delivers an electric energy necessary for the operation of this given communicating device.

5. The communication system for an aircraft according to claim 1, wherein the first concentrator is arranged to receive, via a communication channel common to several of the communicating devices of the first plurality of communicating devices, data sent by these communicating devices and each of these communicating devices being, on the one hand, arranged to detect if the common communication channel is in use by another of the communicating devices and on the other hand, arranged to send data to said first data concentrator via this common communication channel, only when none of the other communicating devices uses this common communication channel.

6. The communication system for an aircraft according to claim 1, wherein each given communicating device of the first plurality of communicating devices is arranged to select a communication channel of said plurality of communication channels and to use this selected communication channel to send its unique identification signal to the first concentrator.

7. The communication system for an aircraft according to claim 6, wherein each given communicating device of the first plurality of communicating devices is arranged to perform said selection of communication channel using a random channel selection function.

8. The communication system for an aircraft according to claim 6, wherein each given communicating device of the first plurality of communicating devices is arranged to detect if the channel selected to send the identification signal is in use by another of said communicating devices and to send its unique identification signal to the first concentrator via this selected channel only when none of the other communicating devices uses this selected channel.

9. The communication system for an aircraft according to claim 8, wherein each given communicating device of the first plurality of communicating devices is arranged to count a duration and to start the sending of its unique identification signal after the counted duration is equal to a random value comprised between a predetermined minimum duration and a predetermined maximum duration.

10. The communication system for an aircraft according to claim 1, wherein the data sent by at least some of the communicating devices are measurements taken by sensor, these measurements being comprised in the group of measurements comprising a measurement of a physical feature unique to a given seat of the aircraft, a measurement of a physical feature unique to a given wheel of the aircraft, an aircraft seat deformation measurement, an aircraft seat position measurement, a pressure measurement, a temperature measurement.

11. The communication system for an aircraft according to claim 1, comprising a distance estimation module to estimate, for each given communicating device, the first concentrator of which has received an identification signal, a distance value of this given communicating device vis-à-vis said first concentrator, this distance estimation module being operationally connected to said first concentrator to transmit the estimated distance values of each of these given communicating devices to it, and said first data concentrator being arranged to, according to these estimated distance values, identify those of the communicating devices which are located in a segregation zone unique to this first data concentrator and to only send the assignment signal(s) to the communicating devices located in this segregation zone.

12. The communication system for an aircraft according to claim 11, comprising, in addition to said first data concentrator, several other data concentrators, said distance estimation module being arranged to estimate, for each communicating device, at least one distance value between this communicating device and at least one of said data concentrators, the system comprising an assignment module arranged to, according to estimated distance values between the communicating devices and the concentrators, assign each of the communicating devices of the first plurality of communicating devices to only one of these data concentrators and each of these communicating devices being arranged to only transmit data to the concentrator to which it is assigned.

13. The communication system for an aircraft according to claim 1, wherein the first concentrator is arranged to assign at least one time window, valid for a given communication channel and for a plurality of successive operating cycles of the system, to a communicating device not yet assigned to this time window, if the first concentrator receives no data from a communicating device via this window during a whole number of successive operating cycles.

14. A method for communicating in an aircraft equipped with a communication system for an aircraft comprising:
   a first data concentrator
   a first plurality of communicating devices, each of these communicating devices being adapted to send data to the first concentrator by wireless transmission, the first concentrator being adapted to process data sent by said communicating devices and received by this first concentrator, wherein:
   the first concentrator broadcasts, by wireless transmission, at least one parameterisation signal of at least one operating cycle of the communication system; then each given communicating device of the first plurality of communicating devices sends a unique identification signal to this given communicating device to the first concentrator, in response to this at least one parameterisation signal of the cycle; then the first concentrator broadcasts one or more assignment signals to assign a plurality of time windows, separate from one another, valid for the operating cycle, each time window being assigned to only one of the communicating devices, the first concentrator of which has received a unique identification signal and being associated with at least one communication channel of a plurality of communication channels of the wireless transmission; then each given communicating device transmits data intended for the first concentrator, via said at least one communication channel associated with the time window assigned to this given communicating device, these data being transmitted only during said time window assigned to this only given communicating device.

* * * * *